United States Patent [19]

Ueda

[11] Patent Number: 4,556,487
[45] Date of Patent: Dec. 3, 1985

[54] WATER FILTERING DEVICE

[75] Inventor: Yoshihiko Ueda, Yamaguchi, Japan

[73] Assignee: Takara Kogyo Co., Ltd., Tokyo, Japan

[21] Appl. No.: 596,942

[22] Filed: Apr. 5, 1984

[51] Int. Cl.[4] .............................................. B01D 33/16
[52] U.S. Cl. .................................... 210/267; 210/276; 210/279; 210/289; 210/402
[58] Field of Search ............... 210/267, 275, 276, 279, 210/282, 285, 286, 288, 289, 291, 402, 404

[56] References Cited

U.S. PATENT DOCUMENTS

| 348,534 | 8/1886 | Roeske | 210/267 |
|---|---|---|---|
| 358,107 | 2/1887 | Crocker | 210/267 |
| 424,464 | 4/1890 | Crocker | 210/267 |
| 586,709 | 7/1897 | Kunzel | 210/267 |
| 4,379,750 | 4/1983 | Tiggelbeck | 210/289 |

*Primary Examiner*—Ivars Cintins
*Attorney, Agent, or Firm*—Wenderoth, Lind & Ponack

[57] ABSTRACT

A water filtering device has a substantially horizontal rotatable drum having a filter layer composed of a granular filter material and a space therein, the rotatable drum being rotatable about its own axis, a first water flow pipe extending axially into the rotatable drum in coaxial relationship, the first water flow pipe having a first branch extending radially outwardly in the space for introducing crude water to be filtered into the rotatable drum and discharging waste washing water out of the rotatable drum, and a second water flow pipe extending axially into the rotatable drum in coaxial relationship, the second water flow pipe having a second branch extending radially outwardly in the filter layer for discharging filtered water out of the rotatable drum and introducing washing water into the rotatable drum. The rotatable drum is rotatably mounted on the first and second water flow pipes. The first and second water flow pipes are fixedly mounted on a support base. According to another embodiment, the rotatable drum is rotatably disposed in a water tank.

11 Claims, 8 Drawing Figures

WATER FILTERING DEVICE

BACKGROUND OF THE INVENTION

1. Field of the Invention

The present invention relates to a water filtering device having the mechanism for washing a filter material contained therein.

2. Description of the Prior Art

There have been used various water filtering devices with a filter washing capability. One known type of such a water purification device washes the filter material by ejecting washing water against the surface of a filter layer. According to another water filtering device, the filter material is washed by being stirred by an agitator. In still another water filtering device design, air and washing water are injected into the filter layer to wash the filter material.

The conventional water filtering devices however have proven unsatisfactory in that the filter material cannot sufficiently be washed, and the device is complex and large in size since the washing mechanism is only effective in washing the filter material, but not responsible for filtering crude water.

SUMMARY OF THE INVENTION

It is an object of the present invention to provide a water filtering device having a mechanism for sufficiently washing a filter material.

Another object of the present invention is to provide a water filtering device having a mechanism capable of performing double functions, that is, washing a filter material and filtering crude water, so that the water purification device is simpler in structure and smaller in size than prior water purification devices.

Still another object of the present invention is to provide a water filtering device having an increased water purification capability.

According to the present invention, there is provided a water filtering device comprises a substantially horizontal rotatable drim having a filter layer composed of a granular filter material and a space therein, the rotatable drum being rotatable about its own axis, a first water flow pipe extending axially into the rotatable drum in coaxial relationship, the first water flow pipe having a first branch extending radially outwardly in the space for introducing crude water to be purified into the rotatable drum and discharging waste washing water out of the rotatable drum, and a second water flow pipe extending axially into the rotatable drum in coaxial relationship, the second water flow pipe having a second branch extending radially outwardly in the filter layer for discharging purified water out of the rotatable drum and introducing washing water into the rotatable drum. The rotatable drum is rotatably mounted on the first and second water flow pipes. Crude water to be filtered is pumped through the first water flow pipe and the first branch into the space in the drum, is filtered by the filter layer, and the filtered water is discharged through the second branch and the second water flow pipe. The filter layer can be washed by introducing washing water through the second water flow pipe and the second branch into the filter layer while the drum is being rotated. The washing water, having cleaned the filter layer, is discharged through the first branch and the first water flow pipe.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Identical or corresponding parts are denoted by identical or corresponding reference numbers throughout the views.

Figure 1:
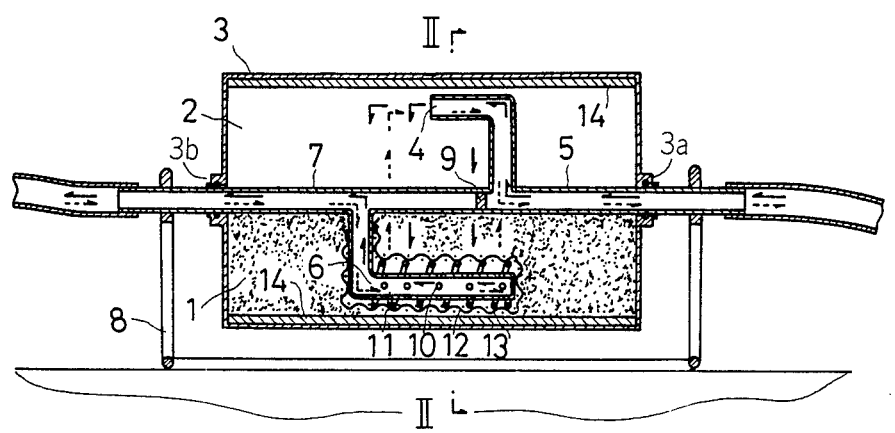
FIG. 1 is a longitudinal cross-sectional view of a water filtering device according to a first embodiment of the present invention.
Figure 2:
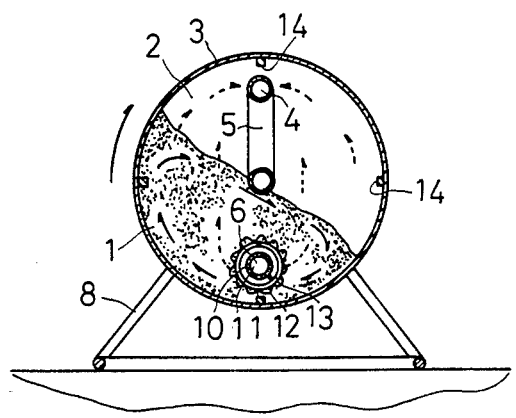
FIG. 2 is a cross-sectional view taken along line II—II of FIG. 1, the view showing the manner in which a filter material is being washed.

FIGS. 1 and 2 illustrate a water filtering device according to a first embodiment of the present invention.

The water filtering device comprises a first water flow pipe 5 and a second water flow pipe 7 extending axially through opposite end walls of a rotatable cylindrical drum 3 in alignment with its central axis and mounted on a support base 8 nonrotatably with respect to the rotatable drum 3. The first and second water flow pipes 5 and 7 are portions of a common tube and are separated axially by a partition 9 positioned therein.

The rotatable drum 3 is rotatably mounted on the common tube constituting the first and second pipes 5 and 7 by bearings 3a and 3b and can be rotated about its own axis by a motor (not shown) operatively coupled to the rotatable drum 3 by means of a conventional power transmitting mechanism. The rotatable drum 3 lies horizontally and has a upper space 2 in the upper part and a filter layer 1 in the lower part. The filter layer 1 may be composed of a normal granular filter material deposited in the lower portion of the drum 3.

The first water flow pipe 5 includes a first L-shaped branch 4 extending radially outwardly in the space 2 in the rotatable drum 3 for introducing crude water into the drum 3 and discharging waste washing water out of the drum 3. The second water flow pipe 7 includes a second L-shaped branch 6 extending radially outwardly in the filter layer 1 for discharging filtered water out of the drum 3 and introducing washing water into the drum 3. The first and second L-shaped branches 3 and 4 are positioned in diametrically opposite relation to each other in the drum 3.

The second branch 6 has a pipe portion 11 extending parallel to the axis of the drum 3 and having a plurality of apertures 10 defined in a wall thereof. The axial pipe portion 11 is covered with the tubular pouch 12 of filter mesh with a helical filamentary friction member 13 coiled around the portion 11 for frictional contact with the inner surface of the filter mesh pouch 12 at the time the filter granular material 1 is washed.

A plurality of agitator wings 14 are mounted on the inner peripheral surface of the rotatable drum 3 at circumferentially spaced intervals for assisting the granular filter material 1 in moving in the rotatable drum 3 when the drum 3 is in rotation.

The water filtering device according to the first embodiment will operate to filter crude water in the following manner:

Crude water is continuously introduced by a pump (not shown) through the first water flow pipe 5 and its first branch 4 into the rotatable drum 3. The crude water is fed, filtered and then discharged as it flows from the first water flow pipe 5 to the first branch 4 to the space 2 to the surface of the filter layer 1 to the filter layer 1 to the filter mesh pouch 12 to the second branch 6 and then to the second water flow pipe 7, as indicated by the solid-line arrows in FIG. 1.

The granular filter material 1 will be washed as follows:

The rotatable drum 3 is rotated at the same time that crude water is continuously introduced via the second water flow pipe 7 into the rotatable drum 3. As the rotatable drum 3 rotates, the granular filter material 1 is moved as shown by the solid-line arrows in FIG. 2 to cause dirt deposits to separate from the granular filter material due to frictional engagement of particles of the granular filter material. The separated deposits are then discharged by washing water introduced into and discharged out of the rotatable drum 3. Where the filter layer 1 is in the form of filter sand, its surface will be tilted at 30° that is the angle of repose for filter sand. On rotation of the drum 3, the surface of the filter sand is continuously caused to fall over to move and agitate the filter material.

The washing water flows from the second water flow pipe 7 to the second branch 6 to the filter mesh 12 to the filter layer 1 to the surface thereof to the space 2 to the first branch 4 then to the first water flow pipe 5, from which the washing water is discharged, as shown by the broken-line arrows in FIGS. 1 and 2. Therefore, the granular filter material 1 in the water purification device can be washed by moving or agitating the granular filter material 1 on rotation of the drum 3 and discharging the washing water through the granular filter material 1 from the second branch 6.

Unwanted dirt deposits are also removed from the outer surface of the filter mesh pouch 12 when the granular filter material 1 is brought into frictional engagement with the filter mesh pouch 12 due to movement of the granular filter material 1 in the drum 3 and also movement of the filter mesh pouch 12. Dirt deposits can likewise be removed from the inner surface of the filter mesh pouch 12 when the moving filter mesh pouch 12 frictionally engages the friction member 13.

Figure 3:
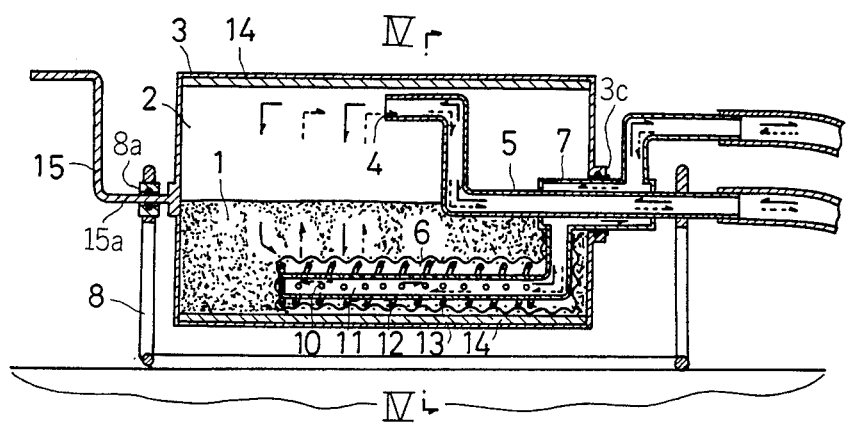
FIG. 3 is a longitudinal cross-sectional view of a water filtering device according to a second embodiment of the present invention.
Figure 4:
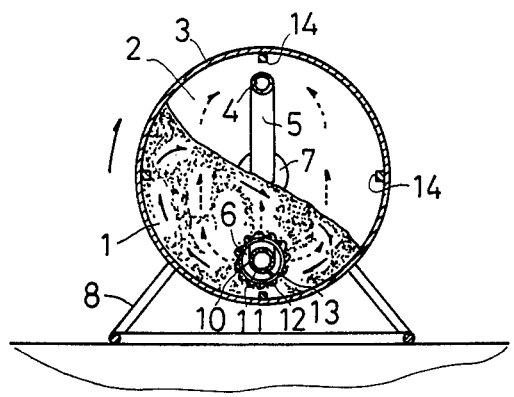
FIG. 4 is a cross-sectional view taken along line IV—IV of FIG. 3, the view showing the manner in which a filter material is being washed.

A water filtering device according to a second embodiment of the present invention will be described with reference to FIGS. 3 and 4.

The water filtering device of the second embodiment primarily differs from the water purification device of the first embodiment in that first and second water flow pipes 5 and 7 extend concentrically through one end wall of a rotatable drum 3 into the drum 3 in alignment with its central axis, and that the rotatable drum 3 is rotated manually by a handle 15 mounted on the other end wall of the drum 3. The first water flow pipe 5 passes concentrically through the second water flow pipe 7 and is supported on a support base 8. The handle 15 has a journal 15a rotatably supported by a bearing 8a on the support base 8. Said one end wall of the drum 3 is rotatably mounted on the second water flow pipe 7 by a bearing 3c.

The water filtering device of the second embodiment operates in the same manner as that in which the water filtering device according to the first embodiment operates.

Figure 5:
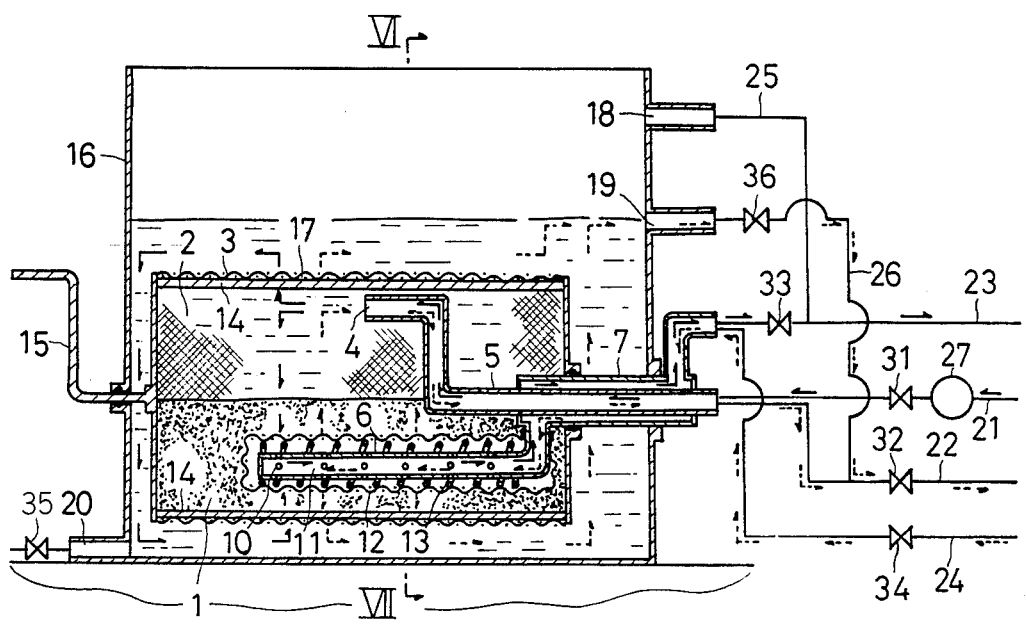
FIG. 5 is a longitudinal cross-sectional view of a water filtering device according to a third embodiment of the present invention, the view also illustrating a piping system.
Figure 6:
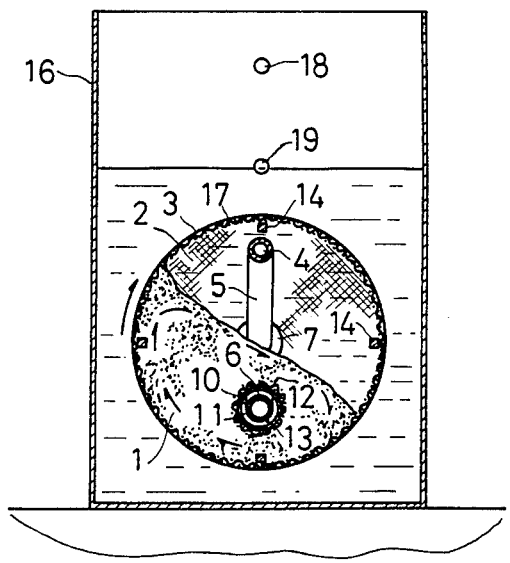
FIG. 6 is a cross-sectional view taken along line VI—VI of FIG. 5.

FIGS. 5 and 6 illustrate a water filtering device constructed in accordance with a third embodiment of the present invention.

The water filtering device shown in FIGS. 5 and 6 is basically similar to the water purification device of the second embodiment. However, the rotatable drum 3 is rotatably mounted in a water tank 16 and has a circumferential wall composed of a cylinder 17 of mesh for allowing crude water to pass therethrough into and out of the drum 3. The handle 15 is rotatably supported on one wall of the water tank 16, and the second water flow pipe 7 is fixedly mounted on an opposite wall of the water tank 16. The water tank 16 has an overflow outlet 18, an outlet 19 for discharging waste water and filtered water, and an outlet 20 for discharging waste water.

A piping system coupled to the water tank 16 comprises a first water pipe 21 coupled to the first water flow pipe 5, a second water pipe 22 coupled to the first water flow pipe 5, a third water pipe 23 coupled to the second water flow pipe 7, a fourth water pipe 24 coupled to the second water flow pipe 7, a fifth water pipe 25 interconnecting the overflow outlet 18 and the third water pipe 23, and a sixth water pipe 26 by which the outlet 19 is connected to the second water pipe 22. A pump 27 for continuously pumping crude water into the rotatable drum 3 and a first valve 31 are disposed in the first pipe 21. Second, third, fourth and sixth valves 32, 33, 34, 36 are disposed respectively in the second, third, fourth and sixth water pipes 22, 23, 24, 26, respectively. The outlet 20 is coupled to a fifth valve 35.

Operation of the water filtering device according to the third embodiment is as follows:

For filtering crude water, the first and third valves 31, 33 are open, the second, fourth and sixth valves 32, 34, 36 are closed, and the pump 27 is operated. Crude water now flows from the first water pipe 21 to the first water flow pipe 5 to the first branch 4 and to the space 2 in the rotatable drum 3. The crude water supplied into the space 2 is divided into two flows. One of the two flows of crude water is filtered as it goes from the space 2 through surface of the filter layer 1 to the filter layer 1 to the filter mesh pouch 12 to the second branch 6 to the second water flow pipe 7 and to the third water pipe 23, from which the purified water is discharged. The other crude water flow is filtered as it flows from the space 2 through the portion of the cylindrical mesh 17 which is exposed to the space 2 to the interior of the water tank 16 to the portion of the cylindrical mesh 17 which is in contact with the filter layer 1 to the filter mesh pouch 12 to the second branch 6 to the second water flow pipe 7 and to the third water pipe 23, from which the filtered water is discharged out. The arrangement shown in FIGS. 5 and 6 results in more effective use of the filter layer 1 and a greater filtering ability since the crude water flows into the filter layer 1 not only from the space 2 but also through the mesh 17.

When the filter layer 1 is clogged with dirt deposits to the extent that the level of crude water in the water tank 16 is raised to the overflow outlet 18, the crude water is permitted to flow out of the overflow outlet 18 and returns through the fifth water pipe 25 and the third water pipe 23. Therefore, the crude water is circulated and filtered continuously without obstruction.

Although in the illustrated embodiment crude water is supplied only through the first branch 4 of the first water flow pipe 5, the water tank 16 may have a crude water inlet for directly supplying crude water into the water tank 16 concurrently with admission of the crude water through the first branch 4.

For washing the filter layer 1, the second, fourth and sixth valves 32, 34, 36 are opened, the first and third valves 31, 33 are closed, and washing water is continuously fed through the fourth water pipe 24. At the same time, the handle 15 is manually operated to rotate the rotatable drum 3 about its own axis. As the drum 3 rotates, the granular filter material in the drum 3 is moved as shown by the solid-line arrows (FIG. 6) to separate dirt deposits from the granular filter material due to frictional engagement of particles of the granular filter material. The separated deposits will then be carried out of the drum 3 by discharging the washing water.

The washing water flows from the fourth water pipe 24 to the second water flow pipe 7 and to the second branch 6 as shown by the broken-line arrows in FIGS. 5 and 6. A portion of the washing water in the second branch 6 flows out of the apertures 10 upwardly to clean the filter layer 1, and then goes through the space 2 to the first branch 4 of the first water flow pipe 5 and to the second water pipe 22, from which the washing water is discharged. Another portion of the washing water in the second branch 6 flow through the apertures 10 downwardly to clean the filter layer 1, and then flows through the mesh 17 contacting the filter layer 1 to the interior of the water tank 16 to the outlet 19 to the sixth water pipe 16 and to the second water pipe 22, from which the washing water is discharged. A portion of the washing water having entered the space 2 flows through the mesh 17 to the interior of the water tank 16 to the outlet 19 to the sixth water pipe 26 and to the second water pipe 22, from which the washing water is discharged.

The filter layer 1 in the drum 3 can be washed effectively by movement of the granular filter material caused by rotation of the drum 3 and the two flows of washing water from the second branch 2 into and through the filter layer 1.

Figure 7:
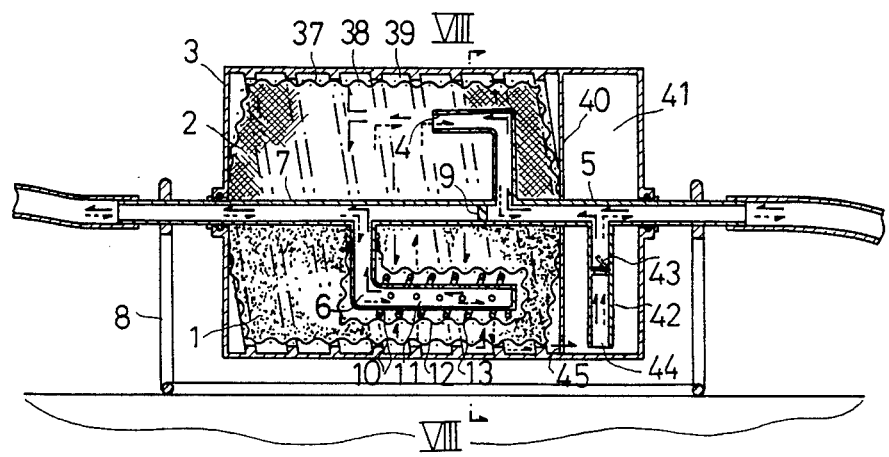
FIG. 7 is a longitudinal cross-sectional view of a water filtering device according to a fourth embodiment of the present invention.
Figure 8:
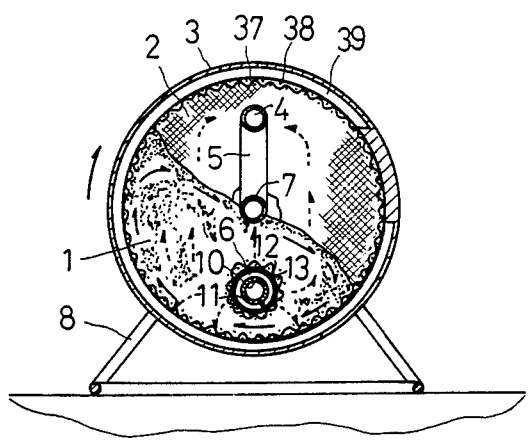
FIG. 8 is a cross-sectional view taken along line VIII—VIII of FIG. 7.

FIGS. 7 and 8 illustrate a water filtering device according to a fourth embodiment of the present invention.

A rotatable drum 3 has a cylindrical partition 37 disposed therein and spaced radially inwardly from the inner peripheral surface of the drum 3. The cylindrical partition 37 comprises a mesh member 38 for passage thererough of fine particles of the granular filter material and crude water. A helical rib 39a extends along the inner surface of drum 3 to define discharge passage 39 between the inner peripheral surface of the drum 3 and the cylindrical partition 37 and which extends circumferentially along the inner peripheral surface of the drum 3 for discharging the fine filter material particles.

The rotatable drum 3 is axially divided by a transverse partition 40 into a chamber accomodating the filter layer 1, the space 2, and the discharge passage 39, and a collection chamber 41 housing an outlet pipe 42 connected to an intermediate portion of the first water flow pipe 5. The outlet pipe 42 has a check valve 43 therein for preventing water from flowing in a direction from the first water flow pipe 5 toward an outlet port 44 of the outlet pipe 42. The discharge passage 39 has a terminal end communicating with the outlet port 44 of the outlet pipe 42 through a discharge port 45 defined in the partition 40.

Operation of the water filtering device for filtering crude water will now be described.

A pump (not shown) is actuated to continuously supply crude water through the first water flow pipe 5 into the rotatable drum 3. The crude water flows from the first water flow pipe 5 through the first branch 4 into the space 2 as indicated by the solid-line arrows in FIG. 7. Most of the crude water which has ingressed in the space 2 is filtered by entering the filter layer 1 through its surface in the drum 3, then is filtered by the filter mesh pouch 12 around the second branch 6, and discharged from the second branch 6 via the second water flow pipe 7. A portion of the crude water which has entered the space 2 is filtered on passage through the mesh 38 exposed to the space 2, and then finds its way into the discharge passage 39. The filtered water then goes through the mesh 38 contacting the filter layer 1 into the latter, and flows through the filter mesh pouch 12 into the second branch 2, from which the filtered water is discharged through the second water flow pipe 7.

A portion of the crude water which has entered the discharge passage 39 flows through the discharge port 45 into the collection chamber 41, in which the crude water is drawn through the outlet port 44 into the outlet pipe 42 under attractive forces generated by the flow of crude water through the first water flow pipe 5. The crude water in the outlet pipe 42 then flows into the first water flow pipe 5, from which it returns through the first branch 4 into the space 2.

When the filter layer 1 in the drum 3 is to be washed, washing water is continuously introduced from the second water flow pipe 7 into the rotatable drum 3, and simultaneously the rotatable drum 3 is rotated. On rotation of the drum 3, the granular filter material of the filter layer 1 in the drum 3 is moved in the direction of the solid-line arrows in FIG. 8 to cause undesired dirt deposits to be separated from the granular filter material due to frictional engagement of particles of the granular filter material. Frictional engagement between the granular filter material and the mesh 38 enables unwanted deposits to come off the surface of the mesh 38.

The separated deposits are then discharged by washing water in the following manner:

As indicated by the broken-line arrows in FIGS. 7 and 8, washing water is introduced through the second water flow pipe 7 into the second branch 6, from which the washing water flows through the apertures 10 upwardly into the filter layer 1 to wash the same and then goes through the surface of the filter layer 1 into the space 2. Most of the washing water which has reached the space 2 is discharged through the first branch 4 and then the first water flow pipe 5. A portion of the washing water flows downwardly out of the apertures 10 in the second branch 6 to wash the filter layer 1, and ingresses into the discharge passage 39 through the portion of the mesh 38 which contacts the filter layer 1. The washing water as it flows into the discharge passage 39 joins the washing water coming through the portion of the mesh 38 which is exposed to the space 2, and the combined washing water goes through the discharge port 45 into the collection chamber 41. The washing water is then drawn up the outlet pipe 42 from the outlet port 44 under attractive forces produced when the washing water flows through the first water flow pipe 5. The washing water then flows from the outlet pipe 42 into the first water flow pipe 5, from which the washing water is discharged.

At the same time that the filter material is thus washed by the washing water, fine particles of the granular filter material are discharged in the following manner:

The particles of the granular filter material are caused to be ground to finer particles by mutual frictional engagement on rotation of the drum 3. Such finer particles of the filter material pass through the mesh 38 into the discharge passage 39 as the rotatable drum 3 rotates, and are then guided by the discharge passage 39 to enter the collection chamber 41 through the discharge port 45. The finer particles collected in the collection chamber 41 are carried by the washing water as it is drawn up the outlet pipe 42 and are automatically discharged therewith through the first water flow pipe 5. As an alternative, an outlet port with an openable lid may be provided in the wall of the collection chamber 41, and finer particles collected in the collection chamber 41 may be removed from the collection chamber 41 through the outlet port by manually opening the lid.

With the arrangements of the present invention, crude water which has entered the rotatable drum 3 through the first water flow pipe 5 can be filtered as it flows from the first water flow pipe 5 to the first branch 4 to the space 2 to the surface of the filter layer 1 to the second branch 6 and to the second water flow pipe 7, from which the filtered water will be discharged.

When it is desired to wash the granular filter material, the rotatable drum 3 is rotated, and at the same time washing water is introduced via the second water flow pipe 7 into the rotatable drum 3. The granular filter material is then caused to move over in the drum 3, and the washing water flows from the second water flow pipe 7 to the second branch 6 to the filter layer 1 to the surface thereof to the space 2 to the first branch 4 and to the first water flow pipe 5, from which the washing water is discharged. The filter layer 1 is now washed by such movement of the granular filter material and the flow of the washing water from the second branch 6 through the filter layer 1.

The water filtering device of the invention is therefore capable of filtering crude water and washing the filter material. The first water flow pipe 5 and its first branch 4 serve dual purposes, that is, to introduce the crude water into the drum 3 and discharge the waste washing water from the drum 3, and the second water flow pipe 7 and its second branch 6 perform double functions, that is, to discharge the filtered water from the drum 3 and introduce the washing water into the drum 3. Accordingly, the rotatable drum 3 has a simple construction and a small size.

Although certain preferred embodiments have been shown and described, it should be understood that many changes and modifications may be made therein without departing from the scope of the appended claims.

What is claimed is:

1. A water filter device comprising:
   a substantially horizontal rotatable drum having a filter layer therein composed of a granular filter material and a space above said filter layer, said rotatable drum being rotatable about its own horizontal axis;
   a first water flow pipe extending into said rotatable drum coaxially with the axis of said drum and having a first branch extending radially upwardly in said drum and into said space for introducing crude water to be filtered into said rotatable drum and discharging waste washing water from said rotatable drum;
   a second water flow pipe extending into said rotatable drum coaxially with the axis of said drum and having a second branch extending radially downwardly in said drum and into said filter layer for discharging filtered water from said rotatable drum and introducing washing water into said rotatable drum;
   said rotatable drum being rotatably mounted on said first and second water flow pipes, and said first and second water flow pipes being fixed within said drum and said drum being rotatable around said pipes.

2. A water filtering device as claimed in claim 1 wherein said branches each has a portion on the end thereof extending horizontally and parallel to the horizontal axis of said drum.

3. A water filtering device as claimed in claim 2 wherein said horizontal portion of said second branch has a plurality of apertures in the wall thereof, and further comprising a pouch of filter mesh disposed around said horizontal portion of said second branch.

4. A water filtering device according to claim 3 further comprising a helical filamentary friction member coiled around said horizontal portion of said second branch and disposed between said horizontal portion of said second branch and said pouch of filter mesh for holding said pouch spaced from said horizontal portion of said second branch.

5. A water filtering device according to claim 1 wherein said rotatable drum has a pair of opposite end walls and a common tube extending between said end walls and having portions constituting said first and second water flow pipes, respectively.

6. A water filtering device according to claim 1 further including a support base on which said first and second water flow pipes are fixedly mounted.

7. A water filtering device according to claim 6 wherein said rotatable drum has a pair of opposite end walls, said first and second water flow pipes being concentric and extending through one of said end walls, and further comprising a handle mounted on the other end wall coaxially with said water flow pipes and rotatably mounted on said support base.

8. A water filtering device according to claim 1 further comprising a water tank on which said first and second water flow pipes are fixedly mounted, said rotatable drum being rotatably disposed in said water tank, said water tank having a valved outlet at a first level above said rotatable drum and connected to said first water flow pipe, and a further outlet above said valved outlet and connected to said second water flow pipe, said second water flow pipe having a valve therein between said further outlet and said rotatable drum.

9. A water filtering device as claimed in claim 8 wherein said rotatable drum has a pair of opposite end walls, said first and second water flow pipes being concentric and extending through one of said end walls, and further comprising a handle mounted on the other end wall coaxially with said water flow pipes, and a support base on which said water flow pipes are fixedly mounted and on which said handle is rotatably mounted.

10. A water filtering device as claimed in claim 8 wherein said rotatable drum has a peripheral wall which is a mesh material.

11. A water filtering device according to claim 1 wherein said rotatable drum has a transverse partition defining first and second chambers in said rotatable drum which are separated axially from each other, and a cylindrical mesh partition disposed in said first chamber and spaced radially inwardly from the inner peripheral surface of said rotatable drum, a helical discharge passage defined between said inner peripheral surface and said cylindrical partition, said partition having an opening therethrough adjacent the end of said helical discharge passage, and an outlet pipe in said second chamber having the inlet end adjacent said opening and connected to said first water flow pipe.

* * * * *